July 27, 1965    A. A. ASHTON ETAL    3,197,005
CLUTCH AND UNIVERSAL DRIVE ASSEMBLY
Filed July 18, 1962    4 Sheets-Sheet 1
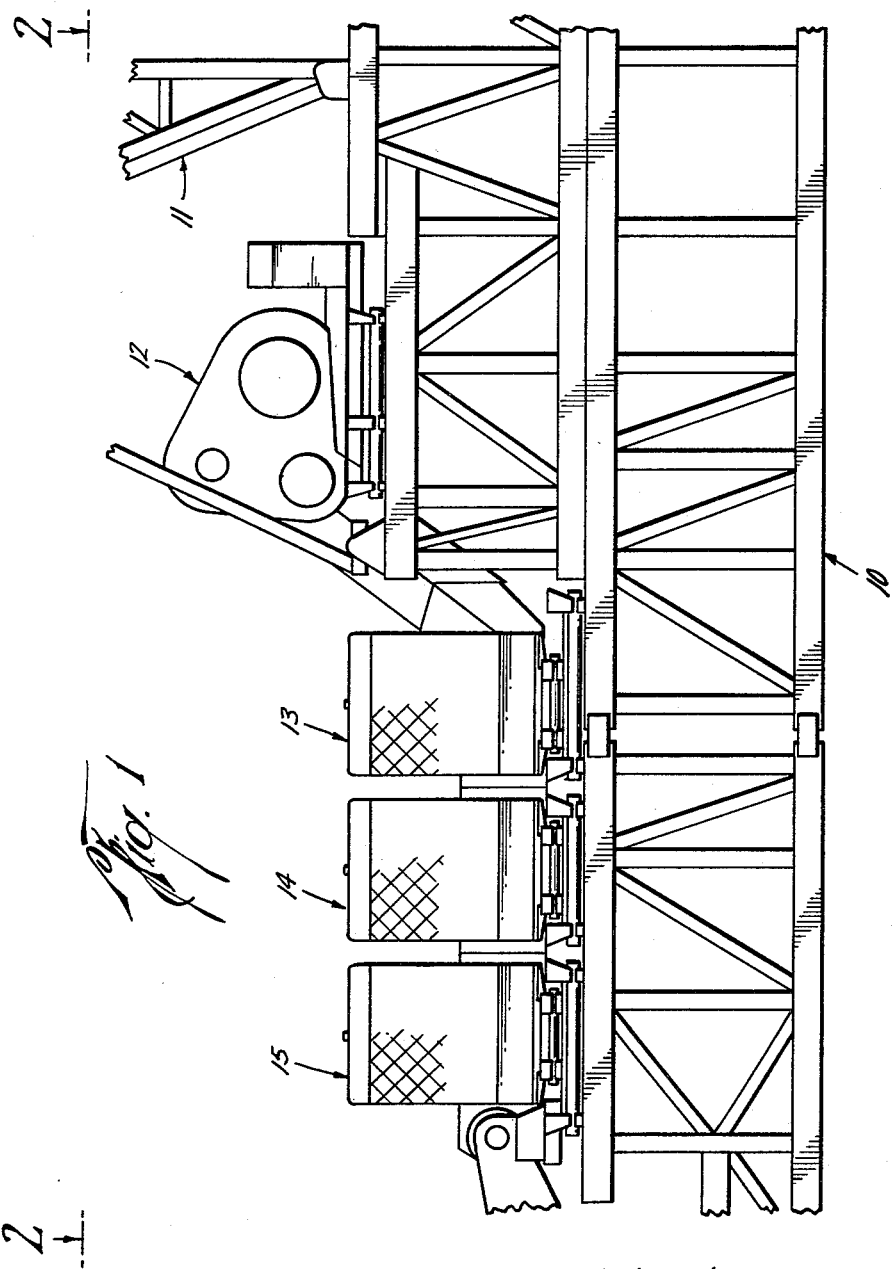
Albert A. Ashton
Norbert O. Brehm
INVENTORS
BY
ATTORNEYS

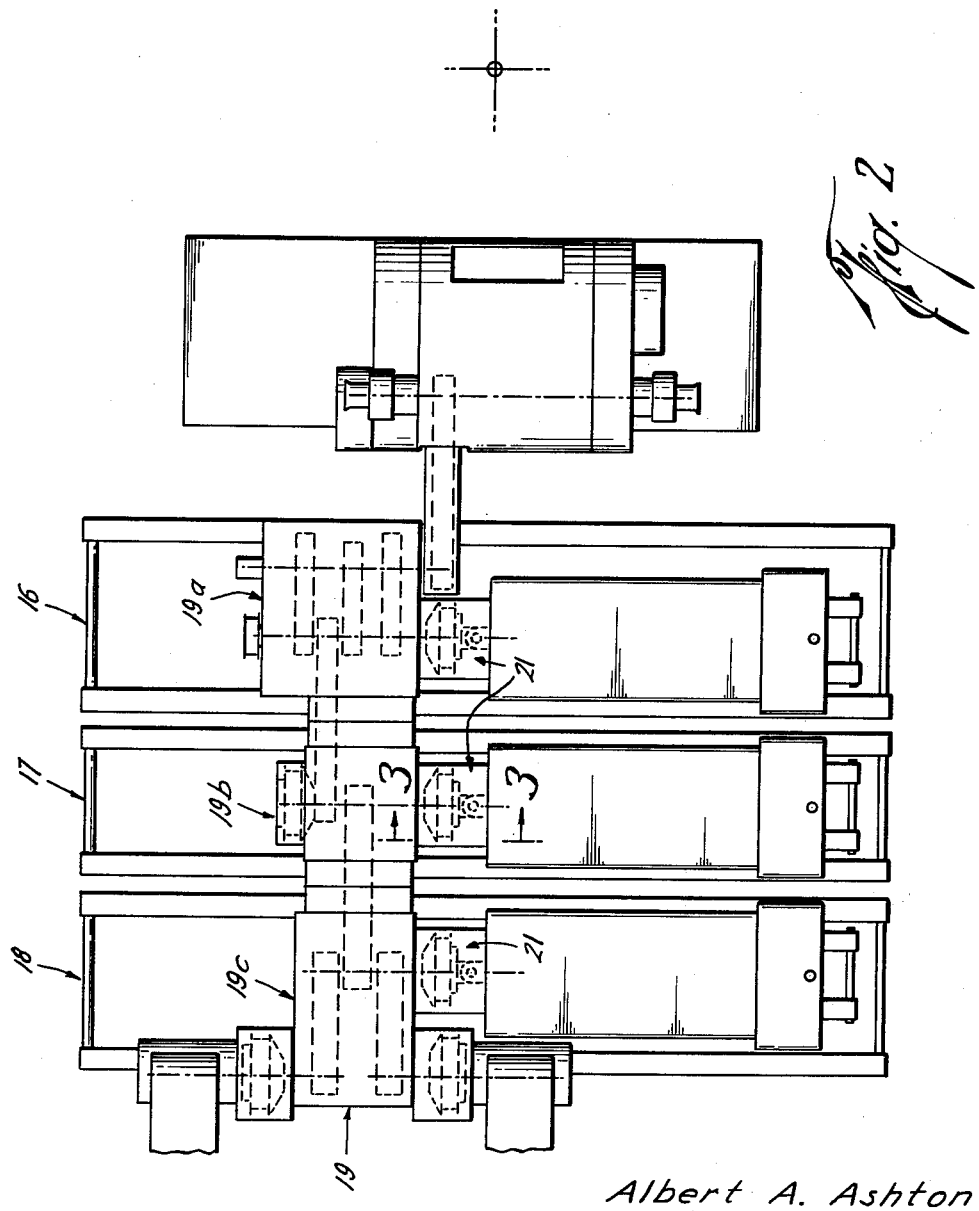

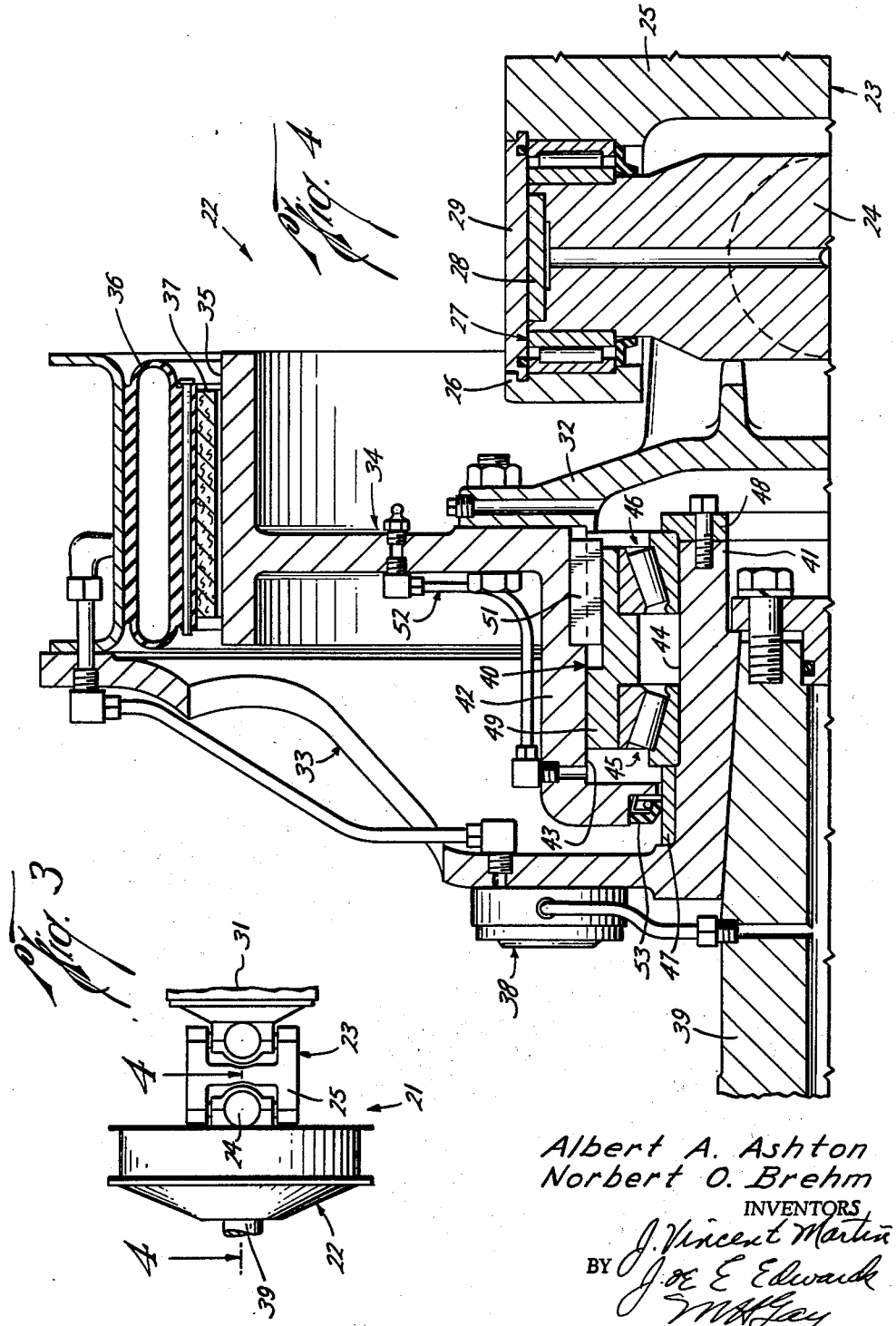

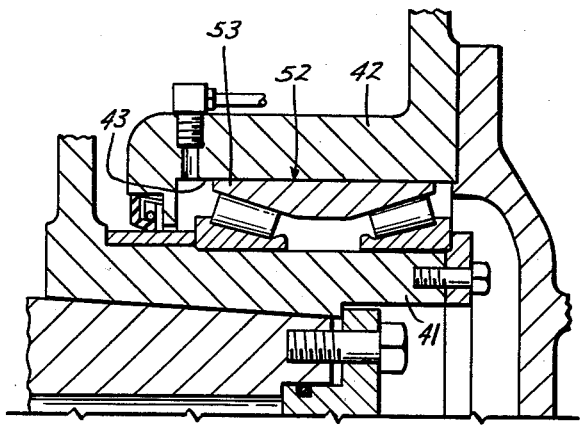
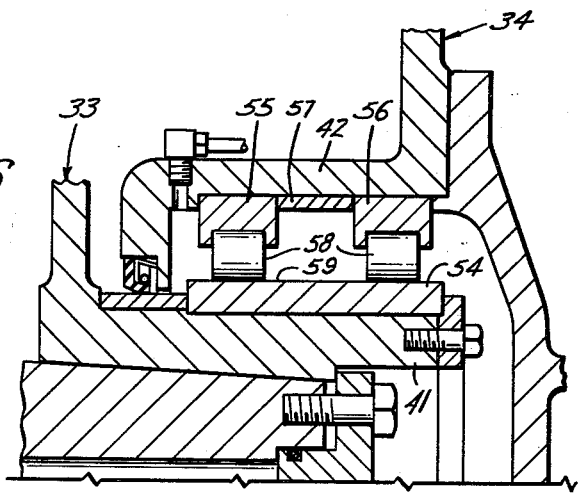
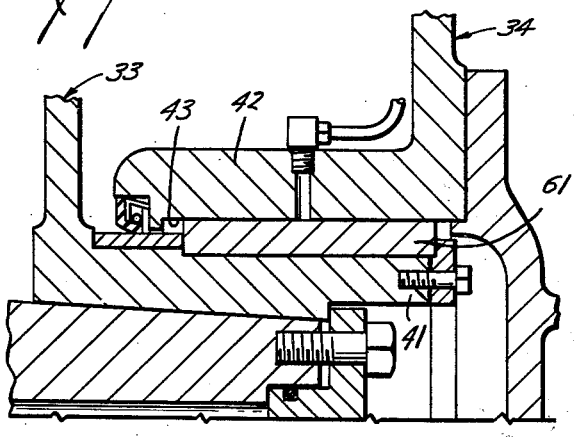

Patented July 27, 1965

1

3,197,005
CLUTCH AND UNIVERSAL DRIVE ASSEMBLY
Albert A. Ashton, Dallas, and Norbert O. Brehm, Houston, Tex., assignors to The Youngstown Sheet and Tube Company, Youngstown, Ohio, a corporation of Ohio
Filed July 18 1962, Ser. No. 210,626
1 Claim. (Cl. 192—110)

This invention relates to drive assemblies, and more particularly to a drive assembly for selectively engaging and disengaging the output shaft of a prime mover to a driven shaft in a manner providing for misalignment and tolerance in position of the two shafts.

In the output transmission assembly of large horsepower engines it is frequently preferred to provide for misalignment of the engine and transmission or other driven device, as well as for tolerance in positioning the driving and driven shafts relative to each other. A prime instance of need for tolerance or misalignment occurs in those cases when the prime mover and the gear train, or the like, are skid-mounted. For instance, in the drilling of wells it is conventional to skid-mount most of the components of equipment used. By way of example, a skid-mounted substructure is usually positioned over the ground and then skid-mounted engines, gear trains, transmissions, etc. are mounted on the substructure. As a solid foundation is not usually employed, the skids are not evenly supported over their entire contact surface and frequently the skid mounts within a single skid assembly will twist sufficient to cause alignment difficulties.

In the past it has been proposed to connect the prime mover and driven shaft of the gear train with a conventional universal joint which includes a spline connection. This has been found unsatisfactory because the high horsepower engines quickly wear out the spline connection.

In the past it has also been the practice to connect the output shaft of a prime mover with a drive shaft through a clutch assembly which provides for limited misalignment. Such misalignment was permitted by a pressure-actuated shoe engaging the clutch drum. The pressure actuation was applied through a large size resilient pressure chamber which would permit some misalignment. This was not entirely satisfactory, however, as the use of the clutch assembly to permit misalignment resulted in stresses being set up which were undesirable.

It is an object of this invention to provide an assembly for connecting the output shaft of a prime mover to a driven shaft which provides for axial tolerance in positioning of the two shafts without the use of a spline connection, thus eliminating this source of wear in the assembly.

Another object is to provide an assembly for connecting the output shaft of a prime mover with a driven shaft which provides for axial misalignment of the two shafts and for tolerance in positioning the two shafts axially relative to each other without the provision of a spline connection.

Another object is to provide an assembly for connecting the output shaft of a prime mover with a driven shaft which provides for axial misalignment of the two shafts and for tolerance in positioning the two shafts axially relative to each other without the provision of a spline connection and without setting up any undesirable stresses due to the provision for misalignment and axial tolerance in positioning of the shafts.

Another object is to provide for misalignment in positioning of two shafts and in positioning them axially relative to each other utilizing a minimum of space to maintain the overall length of the engine and assembly within road limits to permit the entire apparatus to be freely transported over the highway.

2

Other objects, features and advantages of the invention will be apparent from the drawings, the specification and the claims.

In the drawings, wherein there is shown illustrative embodiments of this invention, and wherein like reference numerals indicate like parts:

FIGURE 1 is a view in side elevation of a portion of an apparatus used for drilling a well including the prime movers and drawworks;

FIGURE 2 is a plan view along the line 2—2 of FIGURE 1, particularly showing the engines and compounding assemblies associated therewith;

FIGURE 3 is a view along the line 3—3 of FIGURE 2 on an enlarged scale showing in elevation the clutch assembly and universal joint employed between the prime mover and compounding assembly;

FIGURE 4 is a view along the line 4—4 of FIGURE 3 on a greatly enlarged scale;

FIGURE 5 is a fragmentary quarter-sectional view illustrating an alternate form of this invention;

FIGURE 6 is a fragmentary quarter-sectional view illustrating another form of this invention; and, FIGURE 7 is still another quarter-sectional fragmentary view illustrating a further form of this invention.

Referring first to FIGURES 1 and 2, a substructure indicated generally at 10 is supported on the earth over the well site. While the earth may be levelled, such levelling is frequently done rather hurriedly and further settling of the earth frequently results in an unlevel substructure 10.

This substructure supports the drilling mast, a portion of which is indicated generally at 11, as well as the drawworks indicated generally at 12.

A plurality of skid-mounted prime movers of the internal combustion type are indicated generally at 13, 14 and 15. Each of these units is mounted on its individual skid as indicated respectively at 16, 17 and 18.

Also mounted on the three skids are sections of a compounding assembly indicated generally at 19 which compounds the output of the three prime movers. This output is fed to the drawworks and to other of the apparatus utilized in drilling the well, as will be understood by those skilled in the art. In the form illustrated the compound assembly 19 is provided by three sections 19a mounted on skid 16, 19b mounted on skid 17, and 19c mounted on skid 18. These sections are interconnected during assembly of the apparatus.

Due to settling and other causes the substructure 10 will not maintain a perfectly level base for supporting these skids 16, 17 and 18, and these skids will tend to cock and twist, and the output shaft of the prime movers will tend to be misaligned and to be moved axially relative to the driven or input shaft of the compounding sections 19a, 19b and 19c. The universal joint and clutch assemblies indicated generally at 21 between each engine and the gear train permits such misalignment and provides for tolerance in the axial spacing of said shafts without setting up any undue stresses.

Referring now to FIGURES 3 and 4 wherein the preferred form of this invention is shown, the clutch assembly and universal joint indicated generally at 21 includes the clutch assembly proper 22 and the universal joint 23. The universal joint 23 is conventional in form except that there is no provision for a spline connection of any type associated with the universal joint. In FIGURE 4 one of the cross members 24 of the universal joint is shown. A portion of the double yoke assembly 25 is also shown. From FIGURE 4 it will be noted that the double yoke 25 is secured to the cross member 24 by a cap 26 and a bearing assembly indicated generally at 27 is positioned between the double yoke and cross member. A thrust washer 28 is provided between the cross member 24 and a contact bearing plate 29 carried by the double yoke 25 and cap 26. The remainder of the universal joint 23 is patterned after the portion thereof shown in FIGURE 4, and it will be seen that the universal joint is conventional in form. The universal joint is connected to the output shaft 31 of the prime mover. The other end of the universal joint is connected to the clutch assembly 22 through the adapter yoke 32 which forms a part of the universal joint.

The clutch assembly 22 includes the clutch housing indicated generally at 33 and the clutch drum indicated generally at 34.

The clutch housing and drum are designed for selective rotation relative to each other and for rotation together in the conventional manner to permit clutching and declutching of the engine from the compounding assembly.

The clutch drum has an outer drum surface 35 and the clutch housing carries a boot of resilient material 36 arranged concentrically about the annular surface 35. The boot 36 has mounted on its inner surface a plurality of sections of lining material 37 adapted to engage the surface 35 when the boot 36 is expanded with fluid pressure, and to disengage the drum 35 when pressure is removed from the boot 36 due to contraction of the boot 36. Fluid pressure for energizing and de-energizing the boot 36 is provided in the conventional manner from a source not shown and controlled from the quick release valve indicated generally at 38.

The clutch housing 33 is secured to the driven or input shaft 39 of the compounding assembly. Of course, the clutch assembly and universal joint could be reversed if desired so that the clutch assembly would be secured directly to the prime mover and the universal joint to shaft 39, but the construction shown is preferred.

The clutch housing 33 and clutch drum 34, respectively, are provided with concentric parts 41 and 42. An idler bearing assembly indicated generally at 40 runs between these concentric parts. In accordance with this invention the idler bearing may take any form desired so long as its construction and arrangement relative to the concentric parts 41 and 42 permit relative axial movement between the concentric parts 41 and 42, and thus permits relative axial movement between the clutch housing 33 and clutch drum 34.

In the preferred form the concentric part 41 is provided with a surface 44 on which a pair of roller bearings indicated generally at 45 and 46 are mounted. Spacer 47 limits movement in one direction of the roller bearing 45. Cap 48 secured to concentric part 41 limits movement of roller bearing 46 in one direction. A bearing sleeve 49 which forms a part of the bearing assembly fits over the two bearings 45 and 46 and spaces them apart to thus maintain the two roller bearings 45 and 46 in the position shown in FIGURE 4. This sleeve 49 has a sliding fit with and engages surface 43 on the concentric part 42 of the clutch drum. It will be noted that the axial dimension of sleeve 49 is less than the axial dimension of surface 43 on concentric part 42 and, due to the sliding fit therebetween, the concentric part 42 is free to move axially over the concentric part 41. To prevent relative rotation between the sleeve 49 and the outer concentric part 42 a suitable key 51 may be provided to key the sleeve to part 42.

Means for greasing the bearing is provided by the grease assembly indicated generally at 52 and a suitable seal 53 between the concentric parts 41 and 42 protects the bearing from dust and retains grease therein.

From the assembly as explained above, it is apparent that the output shaft of the prime mover may be misaligned relative to the driven shaft 39 of the compound assembly. This misalignment is provided for by the universal joint. Such misalignment will tend to contract the overall length of the universal joint, and this contraction, as well as any needed tolerance in the axial positioning of the driven shaft and output shaft will be permitted by the outer concentric part 42 of the clutch drum 34 sliding over the bearing assembly, and particularly over sleeve 49 relative to the driven shaft 39. These actions will not set up any undue stresses in the system and, inasmuch as no spline connection is present and relative axial movement between the drive and driven shaft is permitted in the idler bearing mounting, the overall length of the drive assembly between the prime mover and compounding assembly is maintained at a minimum.

In FIGURE 5 there is shown an alternative form of this invention in which the bearing assembly indicated generally at 52 between the inner concentric part 41 and outer concentric part 42 is slightly different from that shown in FIGURE 4. In this instance the outer races of the two roller bearings and the sleeve surrounding these outer races of FIGURE 4 are unitized in a single combination bearing race and sleeve 53 which has a sliding fit with surface 43 of the outer concentric part 42. The member 53 may be keyed to the concentric part 42 if desired.

Referring now to FIGURE 6, a further modification of the invention is shown in which an inner race 54 is fixed on the inner concentric part 41 and a pair of outer races 55 and 56 are fixed in the outer concentric part 42 with a suitable spacer 57 therebetween. A plurality of rollers 58 are held between the inner race 54 and the outer races 55 and 56 with the rollers 58 free to slide along the outer circular surface 59 of the inner race 54. It will be apparent in this form of the invention that movement between the clutch housing 33 and clutch drum 34 is permitted by relative movement between the inner race 54 and the outer races 55 and 56.

In FIGURE 7 is shown a still further form of the invention in which a solid bearing of bronze or the like 61 is positioned between the inner concentric member 41 and the outer concentric member 42. The axial length of the bearing 61 is less than the length of surface 43 on the outer concentric member. Thus, axial movement between the clutch housing 33 and the clutch drum 34 is accommodated by movement of parts 41 and 42 relative to each other over bearing 61.

From the above it will be seen that any form of bearing and any manner of providing for relative movement within the bearing or between the bearing and the inner and outer concentric parts may be utilized, as it is only necessary that the idler bearing be so constructed and mounted that the inner and outer parts can move axially relative to each other to accomplish the objectives of this invention.

The foregoing disclosure and description of the invention is illustrative and explanatory thereof and various changes in the size, shape and materials, as well as in the details of the illustrated construction, may be made within the scope of the appended claims without departing from the spirit of the invention.

What we claim is:

Assembly for releasably connecting the output shaft of a prime mover to a driven shaft comprising;

a universal joint having an input part and an output part universally pivoted to one another; said universal joint having means holding said input and output part against axial movement relative to each other;

means rigidly connecting one of said parts to one of said shafts;

a clutch assembly including a clutch drum and a clutch housing;

one of said clutch drum and said clutch housing connected to the other of said parts and the other of said clutch drum and said clutch housing rigidly connected to the other of said shafts;

clutch means between said clutch drum and clutch housing movable radially to prevent and permit relative rotation therebetween;

remote control means connected to said clutch means and operable to selectively move said clutch means radially;

one of said clutch housing and clutch drum journaled about the other by means comprising, concentric annular surfaces on said clutch housing and clutch drum, an idler bearing mounted between said surfaces and having a contact face in axial sliding engagement with one of said surfaces, said contact face being of a lesser axial dimension than said one surface and permitting axial movement of said clutch housing and clutch drum to provide for misalignment and tolerance in distance between said output and driven shafts.

References Cited by the Examiner

UNITED STATES PATENTS 1,893,413   1/63   Hirsh.

DAVID J. WILLIAMOWSKY, *Primary Examiner.*

ROBERT C. RIORDON, *Examiner.*